(12) United States Patent
Linke et al.

(10) Patent No.: US 7,427,745 B2
(45) Date of Patent: Sep. 23, 2008

(54) OPTICAL SHUTTER FOR MINIATURE CAMERAS

(75) Inventors: Jorg Linke, Vuorentausta (FI); Pasi Ryytty, Espoo (FI)

(73) Assignee: Nokia Corporation, Espoo (FI)

( * ) Notice: Subject to any disclaimer, the term of this patent is extended or adjusted under 35 U.S.C. 154(b) by 91 days.

(21) Appl. No.: 11/255,763

(22) Filed: Oct. 21, 2005

(65) Prior Publication Data

US 2007/0090283 A1    Apr. 26, 2007

(51) Int. Cl.
    G01D 5/34    (2006.01)
    H01J 1/56    (2006.01)

(52) U.S. Cl. .................. 250/229; 359/228; 396/452; 396/457

(58) Field of Classification Search ......... 250/216, 250/229, 208.1; 396/452; 359/228
    See application file for complete search history.

(56) References Cited

U.S. PATENT DOCUMENTS

| | | | | |
|---|---|---|---|---|
| 3,614,202 A | * | 10/1971 | Letter | 359/297 |
| 3,614,203 A | * | 10/1971 | Letter | 359/297 |
| 3,614,211 A | * | 10/1971 | Letter | 359/222 |
| 4,249,814 A | | 2/1981 | Hull et al. | 354/154 |
| 4,505,539 A | * | 3/1985 | Auracher et al. | 385/19 |
| 4,582,391 A | | 4/1986 | Legrand | |
| 4,701,021 A | | 10/1987 | Le Pesant et al. | 350/267 |
| 6,377,383 B1 | | 4/2002 | Whitehead et al. | 359/222 |
| 6,470,106 B2 | * | 10/2002 | McClelland et al. | 385/16 |
| 6,961,167 B2 | * | 11/2005 | Prins et al. | 359/253 |
| 7,016,560 B2 | * | 3/2006 | Ticknor et al. | 385/16 |
| 7,232,226 B2 | * | 6/2007 | Lassar et al. | 353/84 |
| 2003/0002778 A1 | | 1/2003 | Bach | |
| 2004/0114044 A1 | * | 6/2004 | McCurdy et al. | 348/207.99 |
| 2006/0228108 A1 | | 10/2006 | Viinikanoja et al. | |

FOREIGN PATENT DOCUMENTS

| | | |
|---|---|---|
| AU | 711623 | 10/1999 |
| EP | 1300707 | 4/2003 |
| GB | 2206977 | 1/1989 |
| WO | 02/39172 | 5/2002 |

* cited by examiner

*Primary Examiner*—Stephen Yam
(74) *Attorney, Agent, or Firm*—Ware, Fressola, Van Der Sluys & Adolphson, LLP

(57) ABSTRACT

The invention relates to a shutter for an optical imaging system, e.g. a digital camera. The shutter comprises an interface between a transparent body and a capillary space. Light rays introduced to the active area of the interface are reflected by total internal reflection when the capillary space is filled with a gas. The light rays are transmitted through the interface when the capillary space is rapidly filled with a liquid. Thus, the light rays are either absorbed or reflected towards an image sensor, depending on the state of the shutter. The liquid is delivered to the capillary space through at least one duct which is positioned opposite the active area.

13 Claims, 12 Drawing Sheets

US 7,427,745 B2

OPTICAL SHUTTER FOR MINIATURE CAMERAS

FIELD OF THE INVENTION

The present invention relates to the control of optical exposure times in optical imaging devices, e.g. in cameras.

BACKGROUND OF THE INVENTION

Digital cameras comprise imaging optics which are adapted to focus the image of a target onto an image sensor. The image sensor comprises an array of light sensitive pixels. The plurality of signals provided by the individual pixels constitute the digital image of the target. To the first approximation, a signal provided by each individual pixel is proportional to a time period between resetting or activation of said pixel and shifting of said signal (e.g. charge) to a shift register or to a memory.

A typical low-cost image sensor does not comprise charge shift registers and it cannot hold and store the signals. Thus, when the reading of all signals can not take place simultaneously, the signals obtained from the individual pixels correspond to different time intervals. This may lead to a distortion of the recorded image, image artifacts, especially when the camera or the target is moving.

The problem may be remedied by controlling the optical exposure of all pixels substantially simultaneously by using a so-called global shutter. The signal provided by an individual pixel remains substantially constant after the closing of the global shutter, and the obtained image corresponds to simultaneous exposure even though the electrical reading of the pixels would not take place simultaneously.

Traditional mechanical global shutters exhibit several drawbacks, e.g. complex mechanical structure, large size and relatively high power consumption. Therefore, mechanically implemented global shutters are not optimal for imaging systems integrated in small portable devices.

U.S. Pat. No. 4,249,814 discloses a camera shutter which employs the principles of total internal reflection as a means for controlling transmission of light to a camera film. The shutter comprises at least two prism elements. Total internal reflection is enabled or disabled by mechanically opening or closing a gap between said prisms.

U.S. Pat. No. 6,377,383 discloses an optical switch based on total internal reflection. A stiffened surface portion, e.g. a membrane, is suspended in a liquid. The stiffened surface portion is moved electrostatically to enable or disable total internal reflection at an interface.

U.S. Pat. No. 4,701,021 discloses a light beam intensity modulator for controlled attenuation of a light beam. The modulator comprises a capillary space between two prisms. An amount of fluid is displaced electrostatically in said capillary space to enable or disable total internal reflection at an interface between the fluid and the wall of the capillary space. When the total internal reflection is enabled by displacing the fluid away from the capillary space, the reflected light is directed towards an absorbing screen, and the transmitted portion of light is substantially attenuated.

SUMMARY OF THE INVENTION

An object of the present invention is to provide a shutter and a method to control optical exposure in optical imaging systems. Another object of the present invention is to provide an optical device comprising said shutter.

According to a first aspect of the invention, there is provided an optical shutter comprising:
  an interface between a transparent body and a capillary space,
  at least one fluid reservoir,
  an amount of fluid,
  fluid displacement means to displace the fluid between said fluid reservoir and said capillary space in order to change between a first operating state of the shutter and a second operating state of the shutter, said first operating state allowing total internal reflection of oblique light rays impinging on an active area of said interface and said second operating state allowing transmission of said oblique light rays through said active area of said interface,
  one or more fluid ducts opposite said active area for delivering the fluid to said capillary space, and
  absorbing means to absorb the light rays transmitted through said active area of said interface.

According to a second aspect of the invention, an optical device comprises:
  imaging optics,
  an image sensor, and
  an optical shutter, said optical shutter in turn comprising:
  an interface between a transparent body and a capillary space,
  at least one fluid reservoir,
  an amount of fluid,
  fluid displacement means to displace the fluid between said fluid reservoir and said capillary space in order to change between a first operating state of the shutter and a second operating state of the shutter, said first operating state allowing total internal reflection of oblique light rays impinging on an active area of said interface and said second operating state allowing transmission of said oblique light rays through said active area of said interface,
  one or more fluid ducts opposite said active area for delivering the fluid to said capillary space, and
  absorbing means to absorb the light rays transmitted through said active area of said interface.

According to a third aspect of the invention, a method is provided to control optical exposure of an image sensor by a shutter, said shutter comprising an interface between a transparent body and a capillary space, said method comprising:
  guiding light rays to an active area of said interface at an oblique angle,
  displacing an amount of fluid between at least one fluid reservoir and said capillary space through one or more fluid ducts in order to change between a first operating state of the shutter and a second operating state of the shutter, said first operating state allowing total internal reflection of oblique light rays impinging on an active area of said interface and said second operating state allowing transmission of said oblique light rays through said active area of said interface, at least one of said fluid ducts being opposite said active area,
  absorbing light rays transmitted through said active area, and
  in the first operating state guiding light rays reflected from said active area to said image sensor.

Oblique light rays introduced to the active area of the interface are reflected by total internal reflection when the capillary space is filled with a medium having a low refractive index, e.g. gas. The reflected light rays may be subsequently guided via an imaging optics to an image sensor to acquire the digital image of a target. Thus, the optical exposure of the image sensor may be controlled by changing the state of the shutter. The shutter is set to the non-reflecting state by rapidly filling the capillary space with a fluid having a high refractive index. Consequently the total internal reflection of the light rays is frustrated, i.e. disabled. In the non-reflecting state the light rays are transmitted through the active area of the interface and absorbed by the fluid and/or by the opposite surface of the capillary space.

The fluid is introduced to the capillary space through at least one fluid duct which is opposite the active area of the interface. Because the fluid duct is opposite the active area, the traveling distance required for the fluid to completely cover the active area may be substantially shorter than the width of the active area. This increases the operating speed of the shutter.

In an embodiment, the shutter may comprise several adjacent fluid ducts to further increase the operating speed of the shutter and/or to implement a wide active area.

In an embodiment, the fluid may be moved by electrostatic attractive forces and/or by a piezoelectric pump.

The light rays which form the image do not pass through the capillary space, which helps to minimize the distortion of the acquired image. The direction of the light rays is changed upon total internal reflection, which allows implementation of compact and slim optical systems. Only reflected light rays are used for imaging purposes, and the space behind the shutter may be used for further components of a portable device. The moving mass of the fluid may be very small, and, consequently, the vibration and acoustic noise generated during the shutter operation are low. Also the power consumption is very low.

The embodiments of the invention and their benefits will become more apparent to a person skilled in the art through the description and examples given herein below, and also through the appended claims.

BRIEF DESCRIPTION OF THE FIGURES

In the following examples, the embodiments of the invention will be described in more detail with reference to the appended drawings, in which.

DETAILED DESCRIPTION

Figure 1:
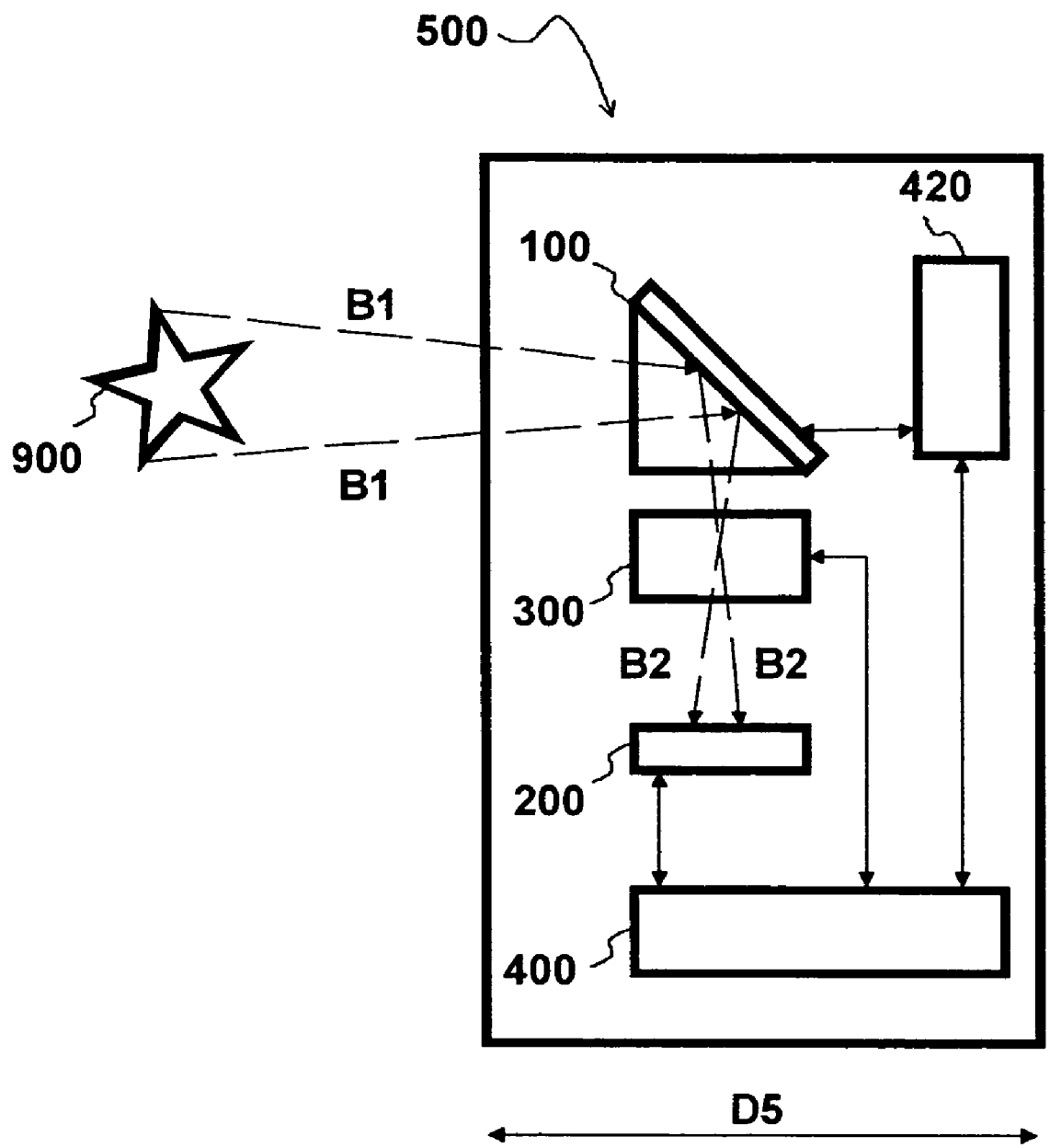
FIG. 1 shows an optical device comprising an optical shutter.

The optical device 500 shown in FIG. 1 comprises an imaging system. The imaging system comprises imaging optics 300 which are adapted to focus light rays B1 coming from a target 900 to an image sensor 200 to form an image of the target 900. The optical exposure of the image sensor 200 is at least partially defined by the shutter 100.

When the shutter 100 is set to a reflecting state, the reflected rays B2 are guided to the image sensor 200 through the imaging optics 300. When the shutter 100 is set to a non-reflecting state, the light rays B1 are absorbed in the shutter 100.

The imaging operation is at least partially controlled by a control unit 400, which directly or indirectly controls the focusing and the aperture of the imaging optics 300, the shutter 100 and the image sensor 200. The device 500 may further comprise a driver unit 420 to provide voltage amplification and/or digital-to-analog conversion of signals sent to the shutter 100.

The imaging optics 300 may be also be positioned before the shutter 100. Individual components of the imaging optics 300 may be positioned both before and after the shutter 100.

The light rays B1 are reflected by the shutter 100 and thus the optical device 500 may be very slim, i.e. the dimension D5 may be small. The angle between the incoming light rays B1 and the reflected rays B2 may be substantially 90 degrees.

Figure 2:
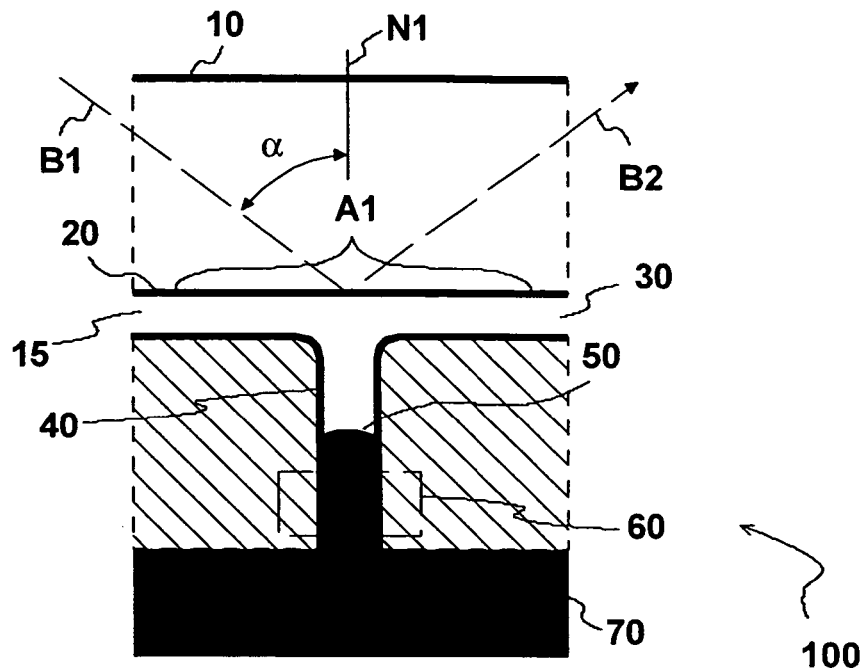
FIG. 2 shows schematically an optical shutter in the reflecting state.

FIG. 2 shows the shutter 100 in its reflecting state. Light rays B1 are guided through a substantially transparent body 10 to an interface 20 between a transparent body 10 and a capillary space 30. The capillary space 30 is filled with a second fluid 15 which has a lower refractive index than the transparent body 10. The light rays B1 are introduced to the interface 20 at an oblique angle α with respect to the normal N1 of the interface 20. The angle of incidence α of the incoming light rays B1, the refractive index of the transparent body 10 and the refractive index of the second fluid 15 are selected such that the light rays B1 are reflected from an active area A1 of the interface 20 by total internal reflection. The reflected rays B2 are guided to the image sensor 200 (FIG. 1). The second fluid 15 may be e.g. gas in order to minimize the refractive index of the second fluid 15.

The shutter 100 comprises also at least one fluid reservoir 70 containing a first fluid 50, at least one fluid duct 40, and fluid displacement means 60. The first fluid 50 is selected to have a higher refractive index than the second fluid 15. The first fluid 15 may be e.g. a liquid. The first fluid 50 and the second fluid 15 are selected such that they are mutually immiscible.

The transparent body 10 may be glass, quartz or plastic, e.g. polycarbonate.

Figure 3:
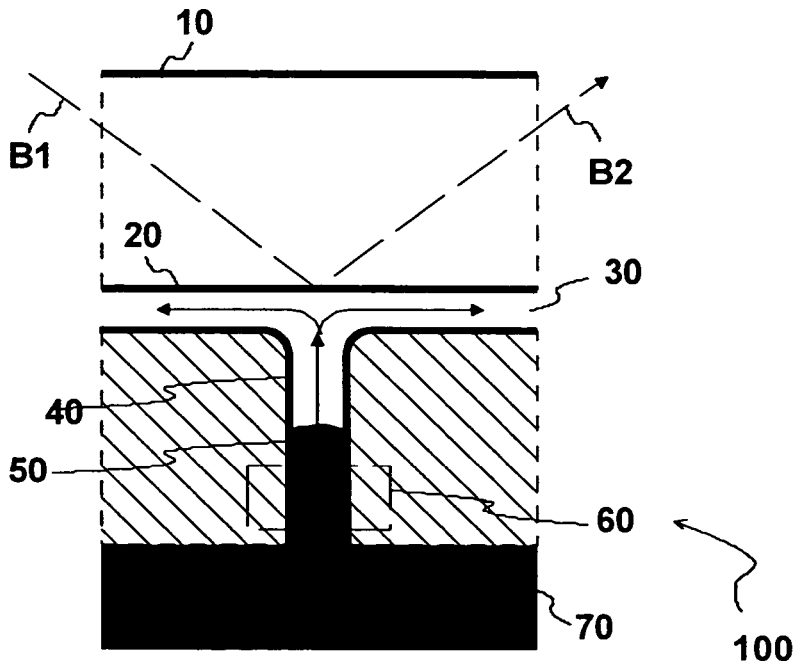
FIG. 3 shows schematically the movement of a first fluid in the shutter according to FIG. 2.

Referring to FIG. 3, the shutter 100 may be set to the non-reflecting state by displacing the first fluid 50 by the fluid displacement means 60 such that the first fluid 50 impinges on the interface 20, and is spread into the cavity 30.

Figure 4:
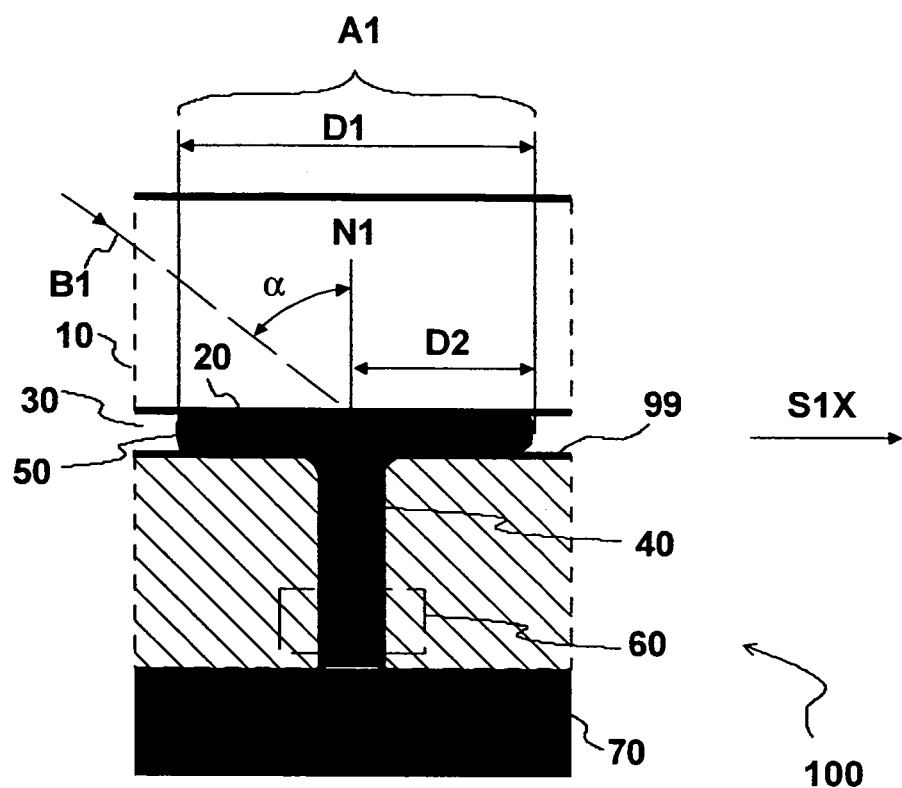
FIG. 4 shows schematically the optical shutter in the non-reflecting state

FIG. 4 shows the shutter 100 in the non-reflecting state, i.e. in the state of frustrated internal reflection. The refractive index of the first fluid 50 is greater than the refractive index of the second fluid 15 such that the criterion for total internal reflection is not fulfilled for the incoming light beams B1. Consequently, the light rays B1 are transmitted through the interface 20 and absorbed in the absorbing surface 99 and/or absorbed by the first fluid 50. The first fluid 50 may comprise dyes to absorb the light rays B1.

The refractive index of the first fluid 50 is selected to be substantially greater than the refractive index of the second fluid 40 such that the light rays B1 are not reflected from the active area A1. The same angles of incidence α are assumed as in FIG. 2. The refractive index of the first fluid 50 may be substantially equal to the refractive index of the transparent body 10.

The active area A1 is the area of the interface 20 which can be set to the non-reflecting state by covering it completely with the first fluid 50, and which can be set to the reflecting state by covering it completely with the second fluid 15. The active area A1 depends on the angle of incidence of the light rays B1.

The minimum angle of light rays for total internal reflection depends on the difference between the refractive index of the transparent body 10 and the second fluid 15. The maximum angle for frustrated internal reflection depends on the difference between the refractive index of the transparent body 10 and the first fluid 50. Thus, maximizing the difference between the refractive index of the first fluid 50 and the refractive index of the second fluid 15 provides a maximum field of view for the shutter 100, i.e. a maximum spread of angles α at which the active area A1 may be changed between the reflecting state and the non-reflecting state.

The shutter 100 comprises one or more fluid ducts 40 opposite the active area A1. Thus, the lateral distance D2 traveled by the fluid fronts, in the direction S1X and in the direction opposite S1X, may be substantially shorter than the width D1 of the active area A1. Consequently, the operating speed of the shutter may be substantially increased when compared with a hypothetical shutter where the first fluid 50 would be introduced from the edge of the active area A1. The orientation of the fluid ducts 40 may be substantially perpendicular to the active area A1. At least one fluid duct 40 may be opposite the center or central region of the active area A1.

The approach of using the total internal reflection requires that the thickness of the capillary space 30 is substantially greater than the wavelength of the light rays B1. The thickness may be e.g. greater than or equal to 1 μm. A small thickness corresponds to a small moving volume of the first fluid 50. However, implementation of a thicker capillary space, e.g. having a thickness of 100 μm reduces flow resistance.

Advantageously, the shutter 100 is hermetically sealed. There may be one or more ducts (see FIG. 12 or 19) to allow the flow of the second fluid 15 from/to the capillary space 30, in order to prevent pressure buildup.

To minimize wetting of the interface 20 with the first fluid 50, the surface tension of the first fluid 50 may be greater than the critical surface tension of the interface 20 and the absorbing surface 99. Thus, the surfaces repel the first fluid 50. This facilitates maintaining an unbroken stable shape of the first fluid 50 in the capillary space 30. The surfaces may be coated with a thin coating of suitable material, e.g. fluoropolymer or silica-based material, in order to modify the critical surface tension. The surface structure may also be modified to implement a superhydrophobic surface.

Figure 5:
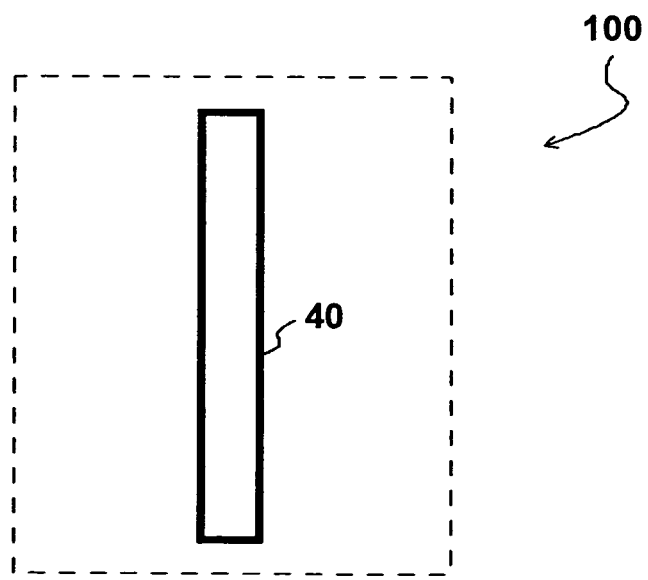
FIG. 5 shows a top view of substantially rectangular fluid duct.

Referring to FIG. 5, the cross-section of the fluid duct 40 may be substantially rectangular. The corners may be rounded.

Figure 6:
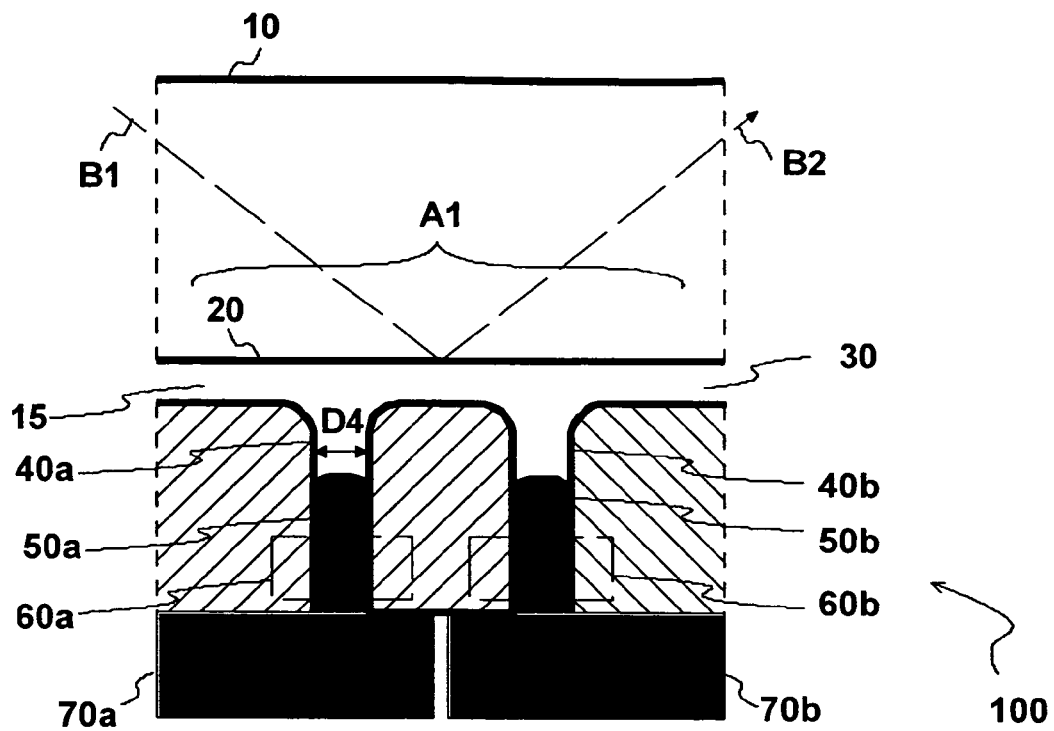
FIG. 6 shows schematically an optical shutter comprising several fluid ducts.

Referring to FIG. 6, the shutter 100 may comprise several adjacent fluid ducts 40a, 40b in order to increase the operating speed. Thus, the individual fluid fronts need to move only a short distance to cover the active area A1. To the first approximation, the operating speed is inversely proportional to the number of the fluid ducts 40a, 40b.

For example, the width D1 of the active area may be 5 mm and the shutter 100 may comprise 17 (seventeen) fluid ducts 40a, 40b. The width D4 of an individual fluid duct 40 may be 0.1 mm and the separation between adjacent ducts may be 0.2 mm. Consequently, the entire width of the active area A1 may be covered when each of the 34 (=2×17) fluid fronts moves laterally a distance of 0.1 mm. Thus, a fluid front velocity of 10 cm/s would provide a switching speed of approximately 1 ms.

Figure 7:
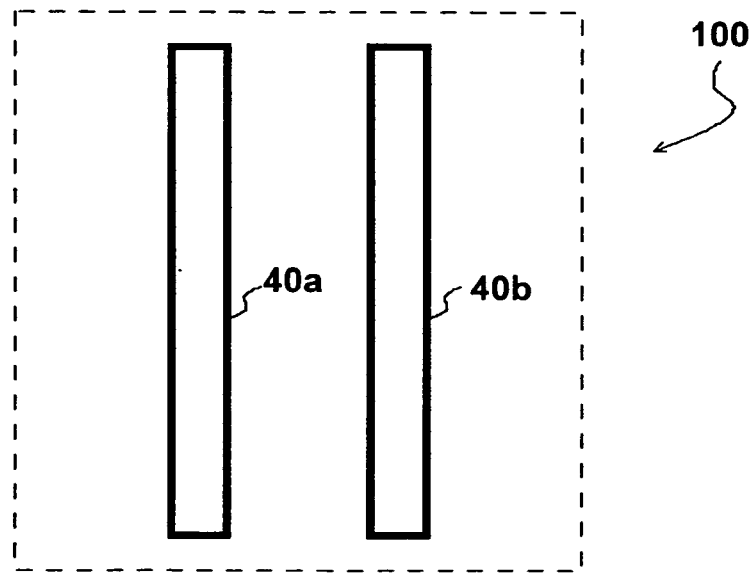
FIG. 7 shows a top view of two substantially rectangular and adjacent fluid ducts.

Referring to FIG. 7, the adjacent fluid ducts 40a, 40b may have a substantially rectangular cross-section.

Figure 8:
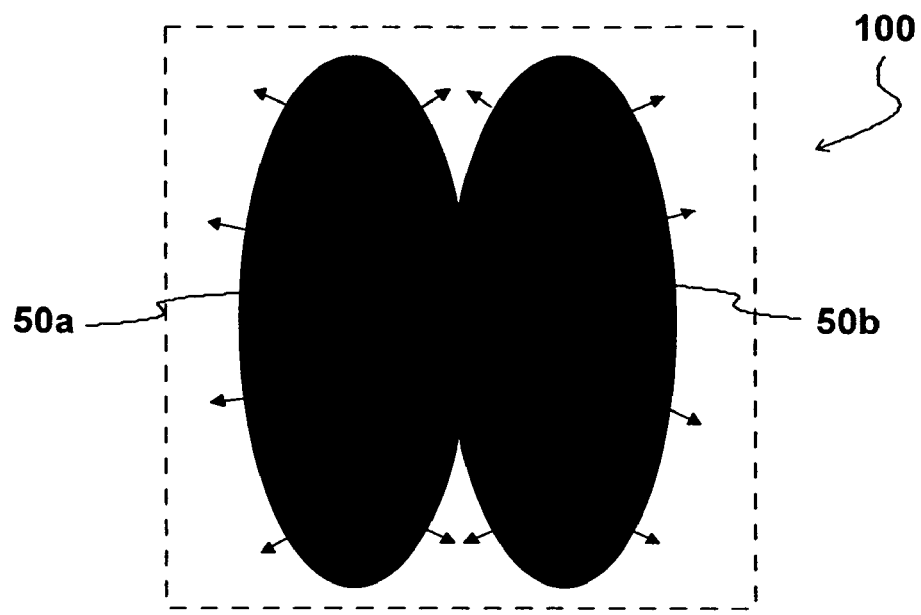
FIG. 8 shows schematically the spreading of the first fluid from the ducts according to FIG. 7.

FIG. 8 shows how the zones of the first fluid 50a, 50b originating from the fluid ducts 40a, 40b are merged in the capillary space 30. It is important to avoid entrainment of the second fluid 15, i.e. to avoid formation of bubbles when the fluid fronts meet each other.

Figure 9:
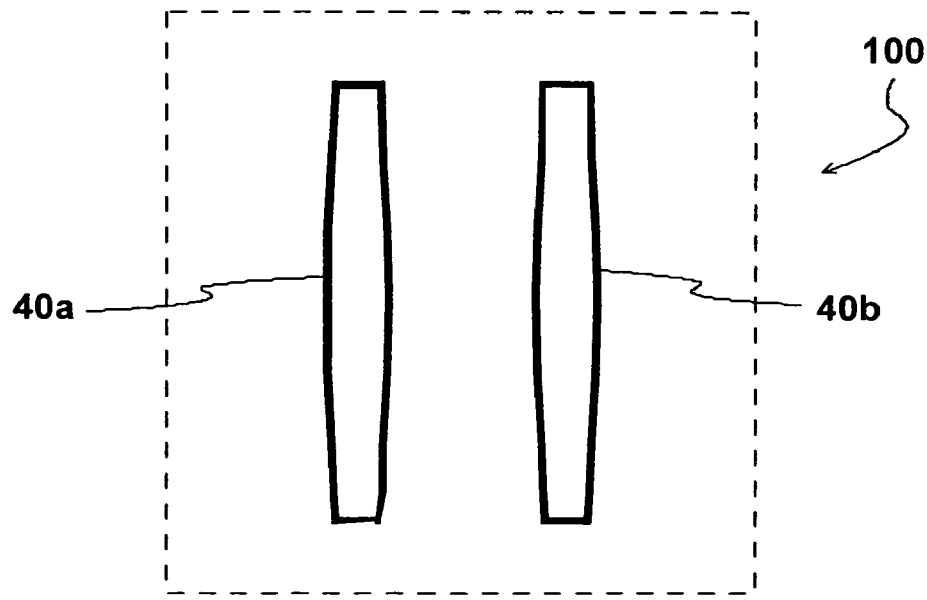
FIG. 9 shows a top view of two substantially rectangular and adjacent fluid ducts wherein the width of the fluid ducts is greater at the center than at the ends.

Referring to FIG. 9, the width of the fluid ducts 40a, 40b may be greater at the center than at the ends to avoid the entrainment of the bubbles.

Figure 10:
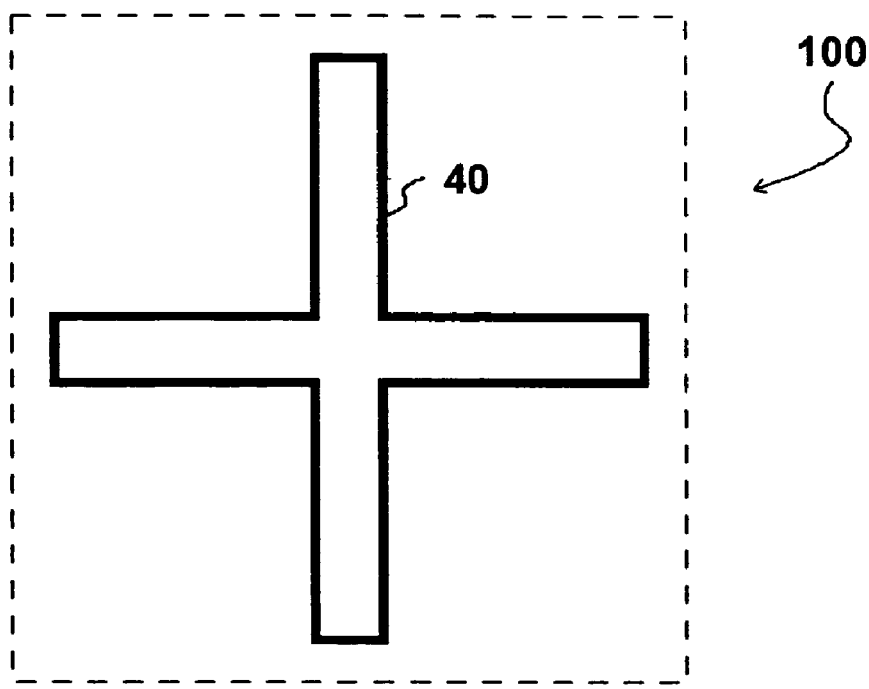
FIG. 10 shows a top view of a fluid duct having the form of a cross.
Figure 11:
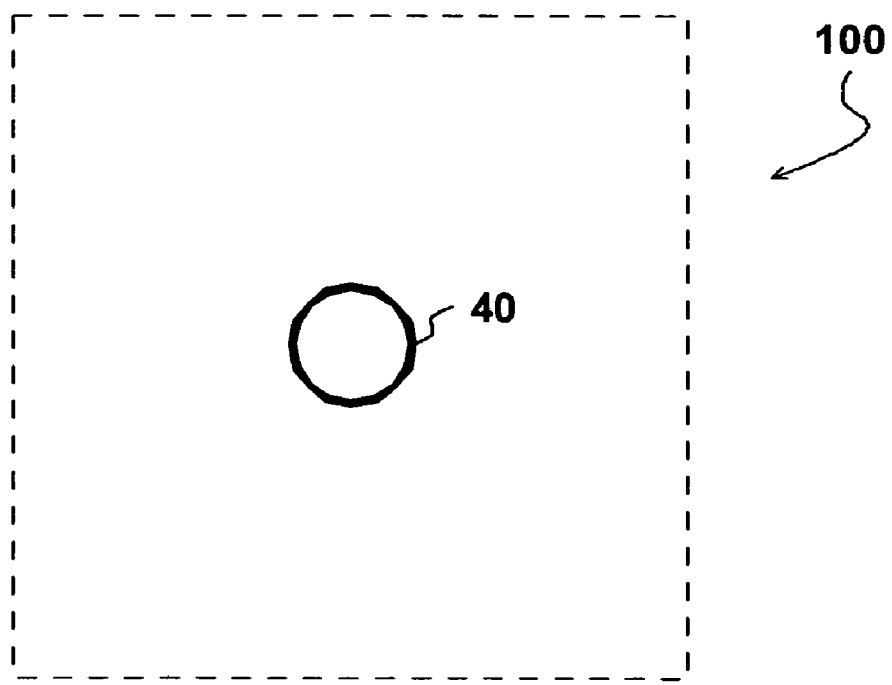
FIG. 11 shows a top view of a circular fluid duct.

Referring to FIG. 10, the cross-section of a fluid duct 40 may be a cross. Referring to FIG. 11, the cross-section of a fluid duct 40 may substantially circular. The cross-section of a fluid duct 40 may also be elliptical.

Figure 12:
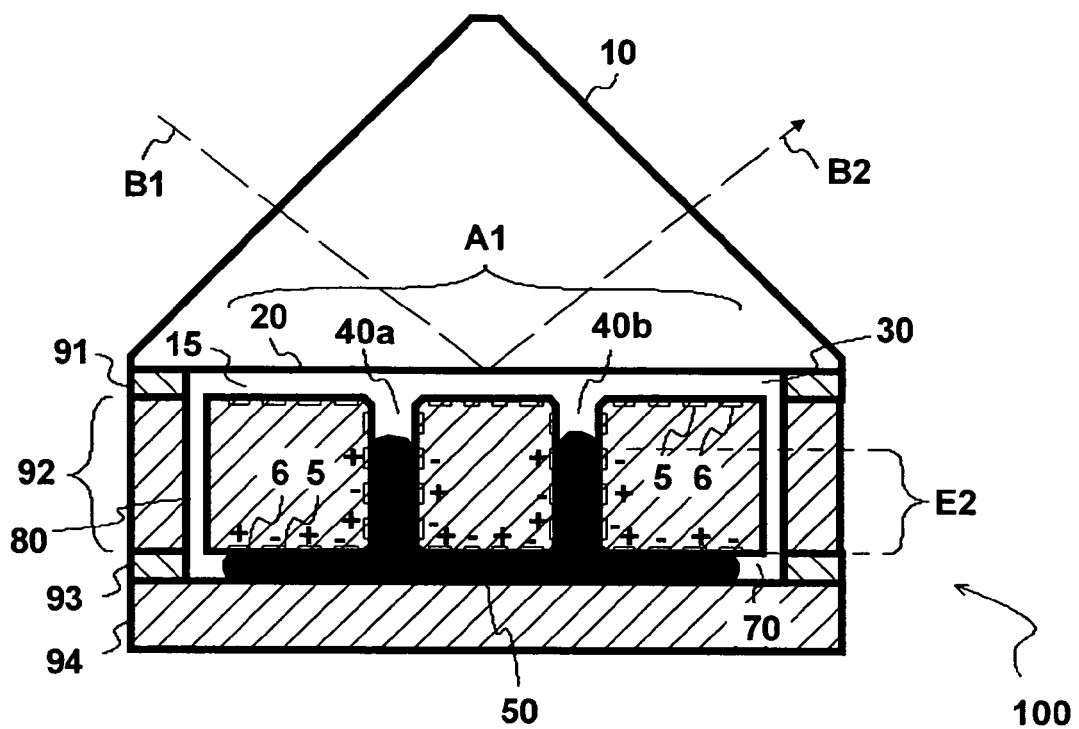
FIG. 12 shows schematically an embodiment of the shutter based on electrostatic displacement of the first fluid, the shutter being in the reflecting state.

Referring to FIG. 12, the shutter 100 may comprise a plurality of electrodes 5, 6 to electrostatically displace the first fluid 50. The first fluid 50 may be selected to have a higher dielectric permittivity than the first fluid 15. Consequently, electric fields generated between the adjacent electrodes 5, 6 attract the first fluid 50, when a voltage difference is coupled between the electrodes 5, 6.

FIG. 12 shows the shutter 100 in its reflecting state. Voltages are coupled to a second group E2 of electrodes 5, 6 such that the electrostatic attractive forces pull the first fluid 50 away from the capillary space 30 and the interface 20, and confine the first fluid 50 to the fluid ducts 40a, 40b and to the fluid reservoir 70.

The transparent body 10 may be a prism. The shutter 100 may comprise a duct segment 92 to implement the fluid ducts 40a, 40b and one or more vent ducts 80. The thickness of the capillary space 30 may be defined by a spacer 91. The fluid reservoir 70 may be implemented by a second spacer 93 and a bottom segment 94.

Figure 13:
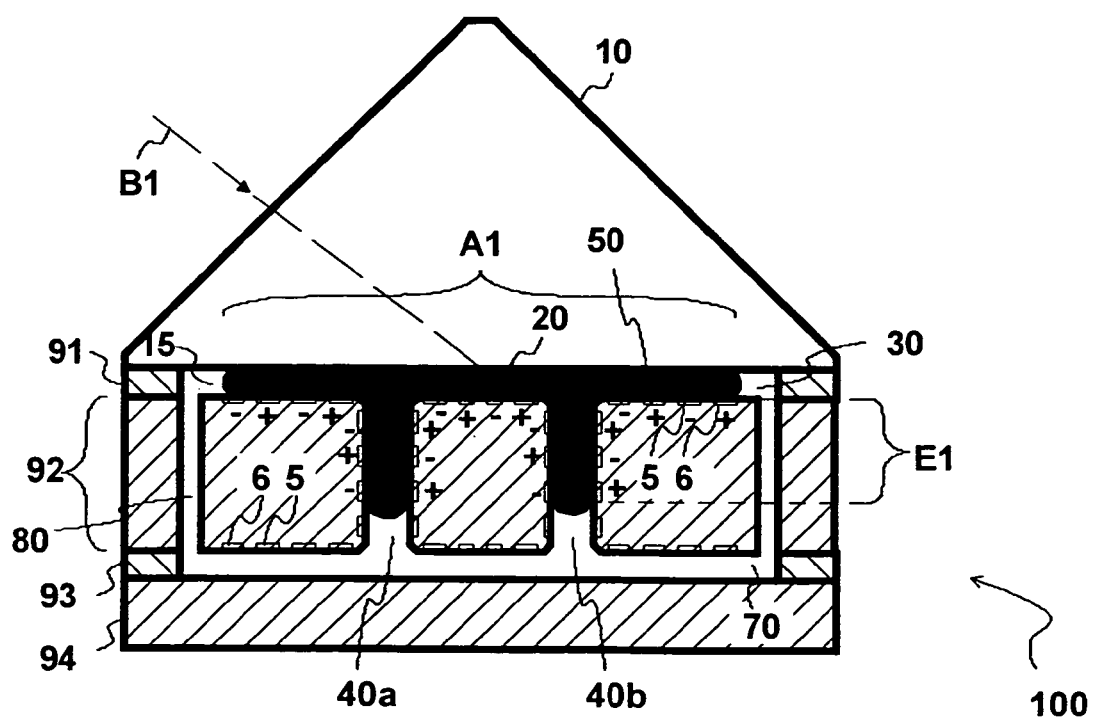
FIG. 13 shows the shutter according to FIG. 12 in the non-reflecting state.

FIG. 13 shows the shutter 100 in its non-reflecting state. The shutter 100 is changed from the reflecting state to the non-reflecting state by applying electric fields by a first group E1 of electrodes such that the electrostatic attractive forces pull the first fluid 50 to the capillary space 30. The voltage difference coupled to the second group E2 of electrodes is switched off, respectively.

The shutter 100 may be set to the reflecting state again by connecting voltages to the electrode arrangement E2 and disconnecting the voltages from the electrode arrangement E1.

A constant voltage difference, a pulsed voltage difference, or an alternating voltage difference may be applied between the electrodes 5, 6. The voltages may be pulsed to reduce power consumption. The spacing between the electrodes may be e.g. 100 μm and the voltage difference applied over the electrodes may be 100 to 1000 Volts, providing an electric field of 1 V/μm to 10 V/μm, respectively. The voltage difference and the attractive force is limited by the dielectric breakdown of the fluids 15, 50 and/or the insulating layers. Also a phenomenon called charge trapping limits the magnitude of the attractive force. The voltage difference may be applied by electrical switching devices (not shown), e.g. transistors. External capacitors may be used to stabilize the voltages. A low battery voltage may be increased by voltage step-up devices.

The first fluid 50 may be chosen from among hydrocarbons, such as alkanes (e.g. hexane), ketones (e.g. acetone, cyclohexanone, methyl ethyl ketone) or nitro-derivatives (e.g. nitromethane, nitrobenzene, nitrotoluene). The first fluid 50 may comprise anti-freezing agent.

The second fluid 15 may be gas or a liquid having low dielectric permeability. The second fluid may be e.g. air, argon or nitrogen. A liquid having high dielectric breakdown strength, e.g. silicone oil may be used instead of gas.

The electric field attracts the first fluid 50 also when the first fluid 50 is electrically conductive and the second fluid 15 is electrically insulating. In that case the electrodes 5, 6 must have an insulating layer to provide insulation between the electrodes 5, 6 and the first fluid 50. The first fluid 50 may be an electrically conductive salt solution, e.g. a water-based solution of sodium chloride.

Alternatively, the first fluid 50 may be insulating and the second fluid 15 may be conductive.

Alternatively, the second fluid 15 may be selected to have a higher permittivity than the first fluid 50 while the second fluid 15 still has a lower refractive index than the first fluid 30.

The second fluid 15 may escape from the capillary space to/from the fluid reservoir 70 through the vent ducts 80, in order to prevent pressure buildup.

The vent ducts 80 may be so narrow that the first fluid 50 does not penetrate into the vent ducts 80, due to surface tension.

Figure 14:
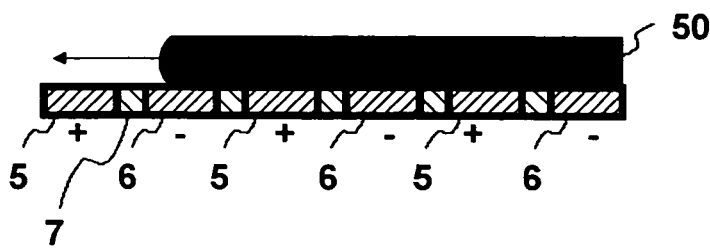
FIG. 14 shows schematically an electrode arrangement where the electric field is generated between electrodes which are on one side of the fluid.

FIG. 14 shows schematically an electrode arrangement in which the electric field is generated between a plurality of electrodes 5, 6 on one side of the first fluid 50. Voltage difference applied between the electrodes 5, 6 generate electric fields which attract the first fluid 50. In this case the first fluid 50 should have a relatively high permittivity but it should be electrically insulating. Noble metal electrodes may be used to minimize corrosion.

Fillers 7 provide a smooth surface and insulation between the electrodes 5, 6.

Figure 15:
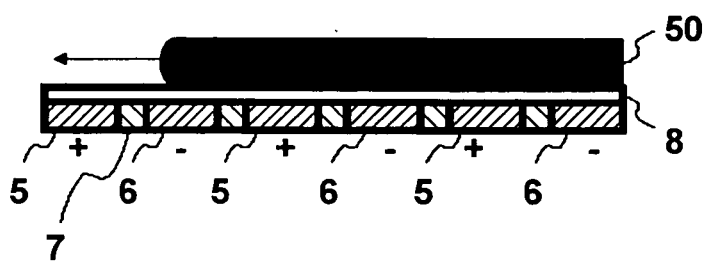
FIG. 15 shows schematically an electrode arrangement where the electric field is generated between electrodes on one side of the fluid, the arrangement comprising an insulating layer between the electrodes and the fluid.

FIG. 15 shows schematically an electrode arrangement in which the electrodes 5, 6 are electrically insulated from the first fluid 50 by the insulator layer 8. In this case the first fluid 50 may also be electrically conducting.

Figure 16:
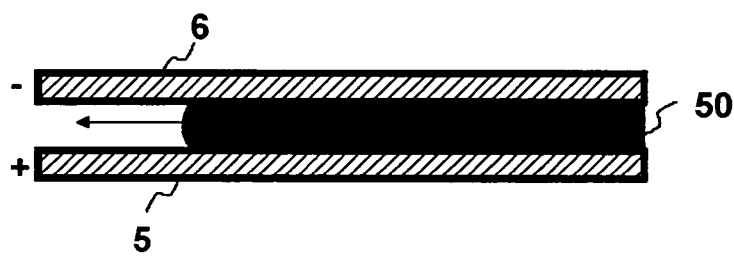
FIG. 16 shows schematically an electrode arrangement where the electric field is generated between electrodes which are on the both sides of the fluid.

FIG. 16 shows schematically an electrode arrangement in which the electric field is generated between electrodes 5, 6 which are positioned on the both sides of the first fluid 50. In this case the first fluid 50 should have a relatively high permittivity but it should be electrically insulating.

Also the electrode arrangement according to FIG. 14 or FIG. 15 may be implemented on the both sides of the first fluid 50 to further increase the magnitude of the attractive force. Electrodes on opposite sides of the first fluid 50 may be adapted to have opposite polarity, as shown in the fluid ducts 40a, 40b according to FIGS. 12 and 13.

Figure 17:
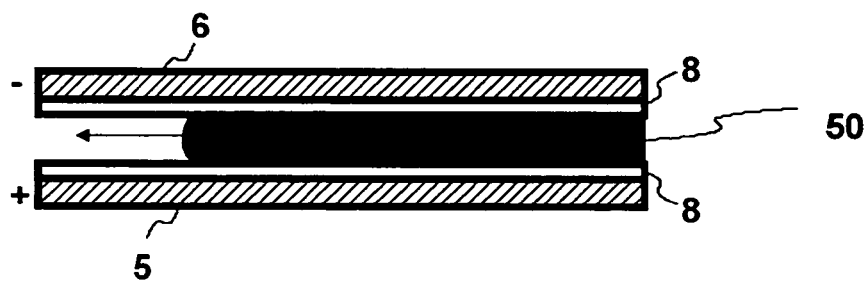
FIG. 17 shows schematically an electrode arrangement where the electric field is generated between electrodes which are on the both sides of the fluid, the arrangement comprising an insulating layer between the electrodes and the fluid.

FIG. 17 shows schematically an electrode arrangement in which the electrodes 5, 6 are electrically insulated from the first fluid 50 by the insulator layers 8. In this case the first fluid 50 may also be electrically conducting.

The active area A1 is advantageously free from electrode structures, in order provide a very flat optical surface. However, in some applications it may be advantageous to implement transparent electrodes on the active area A1 of the interface 20. A transparent electrode may be implemented using e.g. indium tin oxide (ITO). Alternatively, mesh or grid pattern electrodes may be used.

Figure 18:
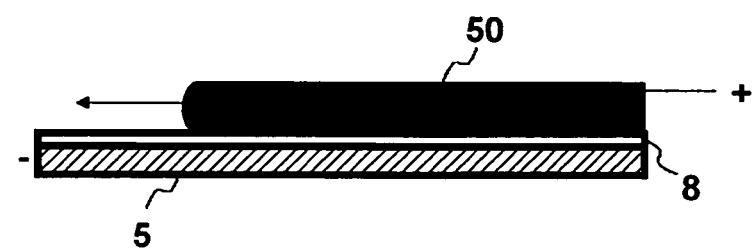
FIG. 18 shows schematically an electrode arrangement where the electric field is generated between one or more electrodes and an electrically conducting fluid.

FIG. 18 shows schematically an electrode arrangement where the electric field is generated between one or more electrodes and an electrically conducting first fluid 50. In other words the voltage difference is applied between one or more electrodes and the first fluid 50.

Figure 19:
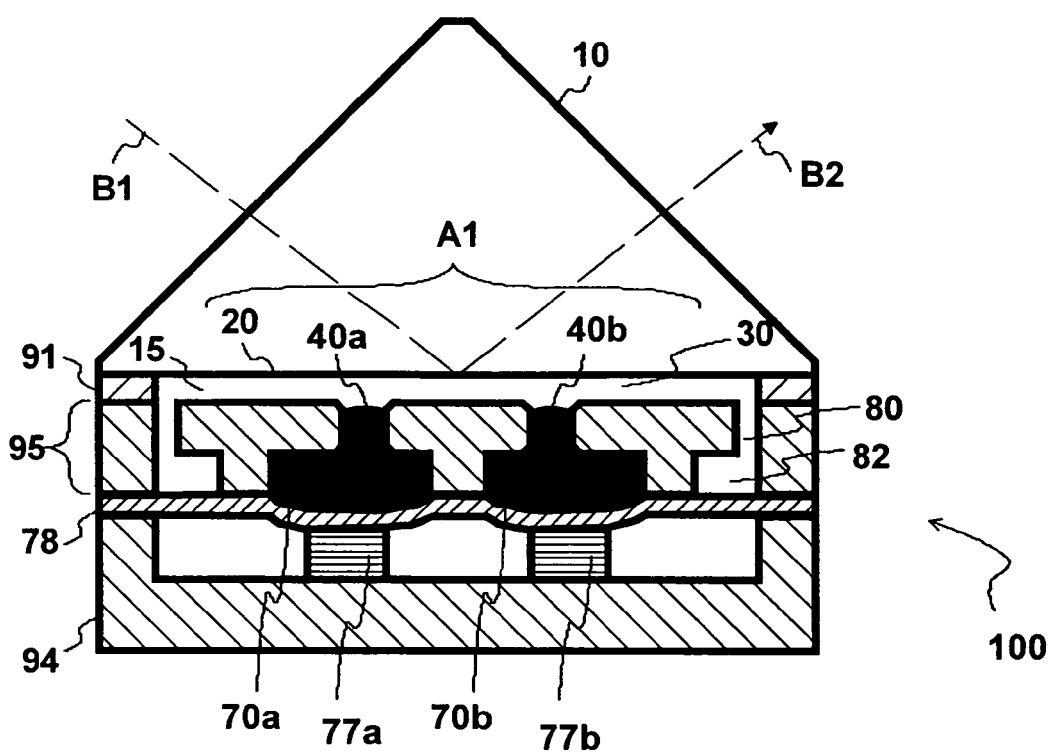
FIG. 19 shows schematically an embodiment of the shutter based on piezoelectric fluid displacement means, the shutter being in the reflecting state.

Referring to FIG. 19, the shutter 100 may comprise one or more piezoelectric actuators 77a, 77b to displace the first fluid 50. A membrane 78 and the cavities of a duct segment 95 define fluid reservoirs 70a, 70b.

The duct segment 95 may comprise on or more vent ducts 82. The duct segment 95 and the membrane 78 may also define a vent reservoir 82. The thickness of the capillary space 30 may be defined by a spacer 91. The piezoelectric actuators may be supported by a bottom segment 94.

Figure 20:
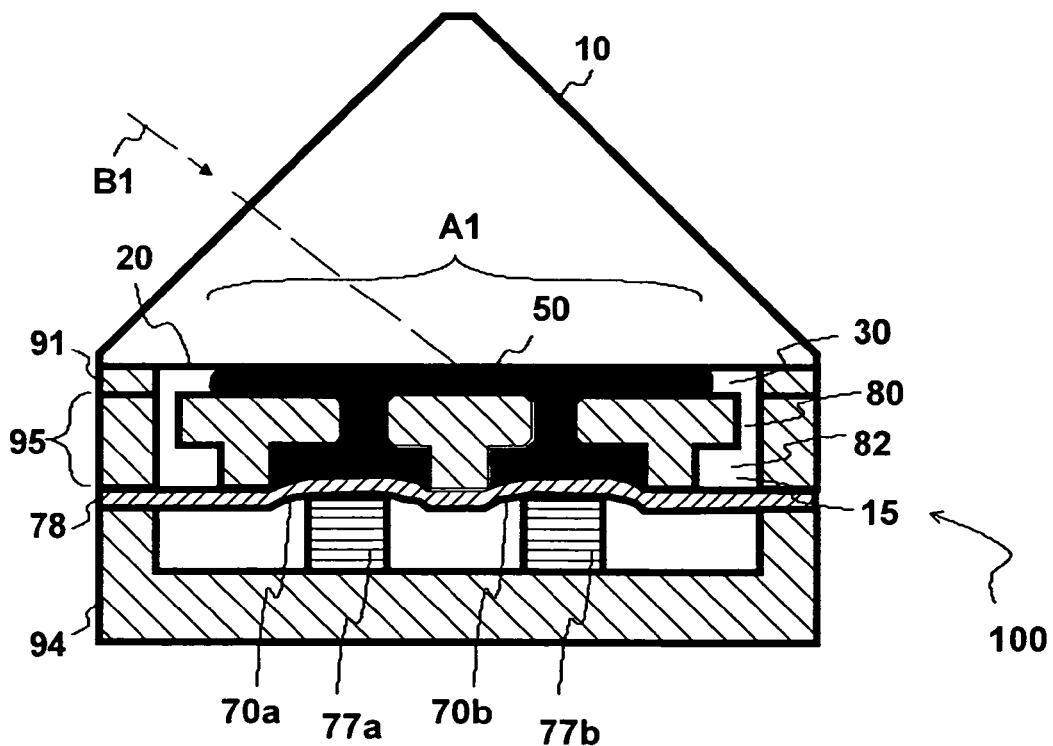
FIG. 20 shows the shutter according to FIG. 19 in the non-reflecting state.

FIG. 19 shows the shutter 100 in its reflecting state. Referring to FIG. 20, the shutter 100 may be set to the non-reflecting state by expanding the piezoelectric actuators 77a, 77b. Consequently, the internal pressure of the fluid reservoirs 70a, 70b is increased and the first fluid 50 is ejected to the capillary space 30 to cover the active area A1. The escaping second fluid 15 is vented to the vent reservoirs 82 through the vent ducts 80.

The shutter 100 may be set to the reflecting state again by contracting the piezoelectric actuators 77a, 77b. Consequently, pressure is reduced in the fluid reservoirs 70a, 70b and the first fluid 50 is sucked from the capillary space 30 to the fluid reservoirs 70a, 70b.

A common fluid reservoir and a common actuator may be used for several fluid ducts 40a, 40b.

Also other types of electrostatic actuators or electromagnetic actuators may be used instead of the piezoelectric actuators. An electromagnetic actuator may be based e.g. on a coil in the vicinity of a moving magnet or another coil. An electrostatic actuator may be based e.g. on a charged foil in the vicinity of an electrode.

Figure 21:
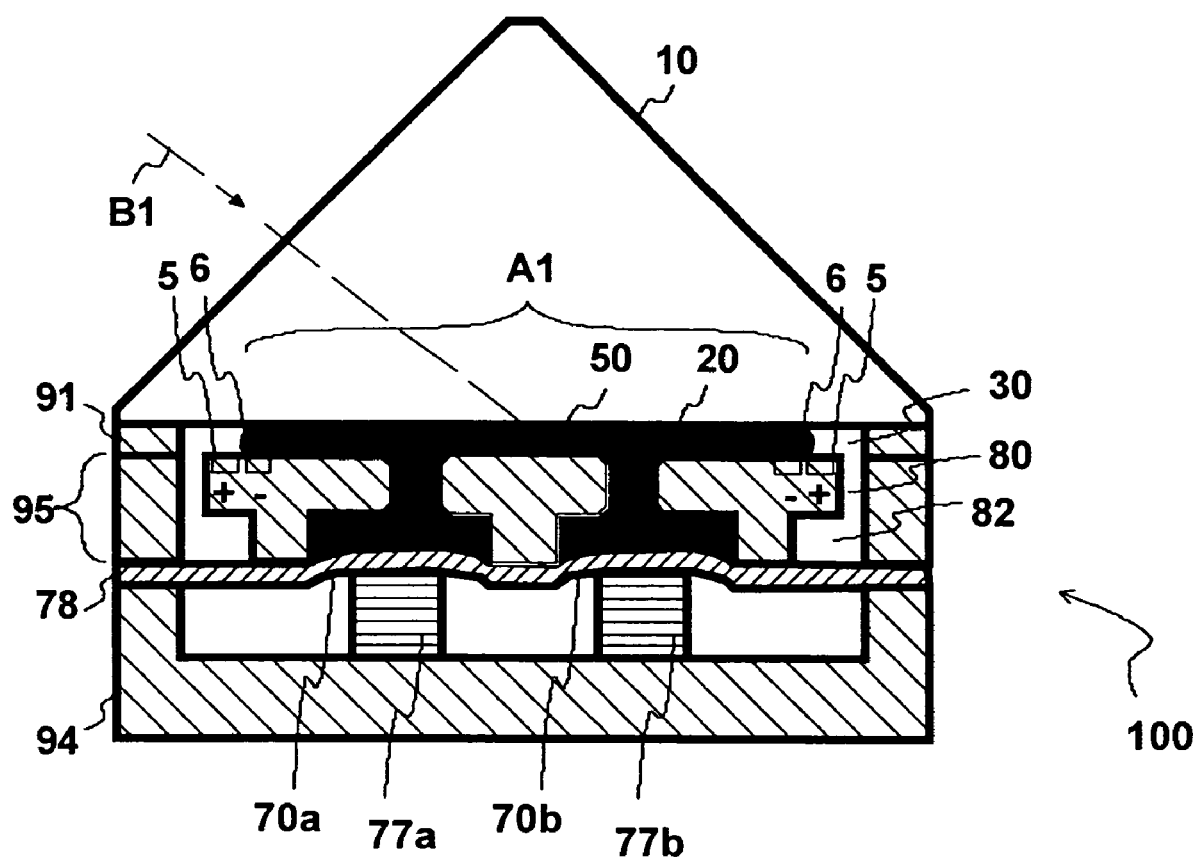
FIG. 21 shows schematically an embodiment of the shutter based on piezoelectric actuators, the shutter comprising an electrode arrangement to confine the fluid within a predetermined area.

Referring to FIG. 21, the shutter 100 may comprise an electrode arrangement 5, 6 to confine the first fluid 50 within the active area A1, i.e. to prevent the first fluid 50 from escaping to the vent ducts 80. In other words the boundary of the first fluid 50 may be electrostatically stabilized.

Figure 22:
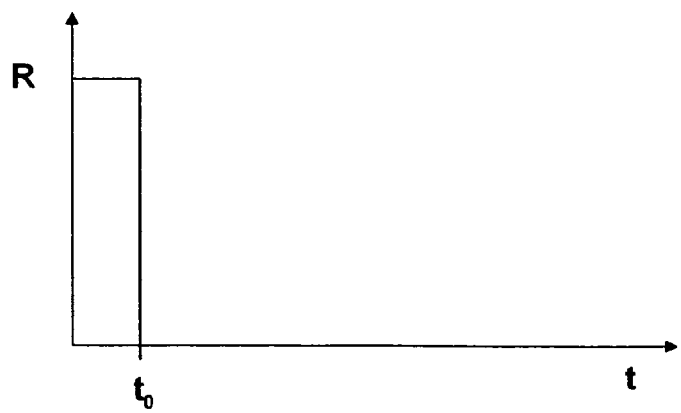
FIG. 22 shows a change of reflectance provided by an ideal optical shutter.

FIG. 22 shows the temporal behavior of an ideal shutter. R denotes reflectivity and t denotes time. When a command is sent to the shutter at a time $t_0$, the reflectivity R of the shutter is immediately changed from a full value to zero.

Figure 23:
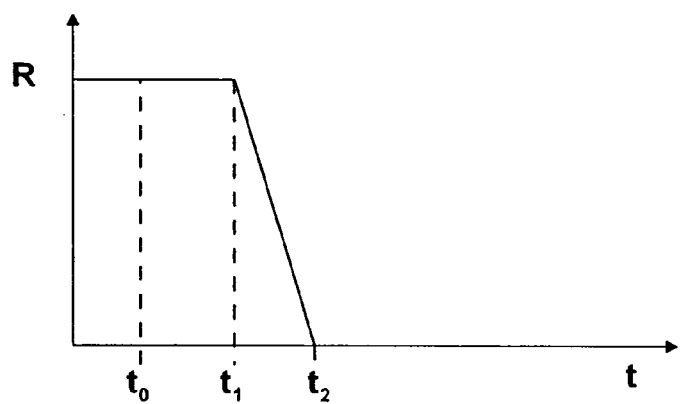
FIG. 23 shows, by way of example, a change of reflectance provided a shutter according to the present invention.

Referring to FIG. 23, the real shutter 100 has a delay $t_1$-$t_0$ before any change is detected after a command. The change of the reflectivity takes place during another time interval $t_2$-$t_1$. The time interval $t_2$-$t_1$ is advantageously very short, e.g. in the order of 0.01 s or 0.001 s, to define the optical exposure accurately.

Figure 24:
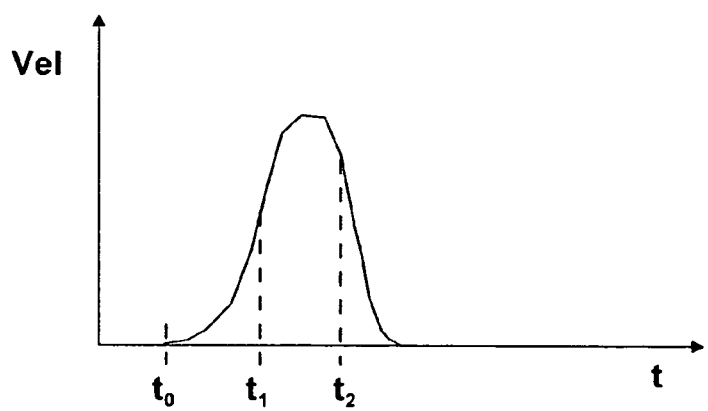
FIG. 24 shows, by way of example, the velocity of the fluid front as a function of time.
Figure 25:
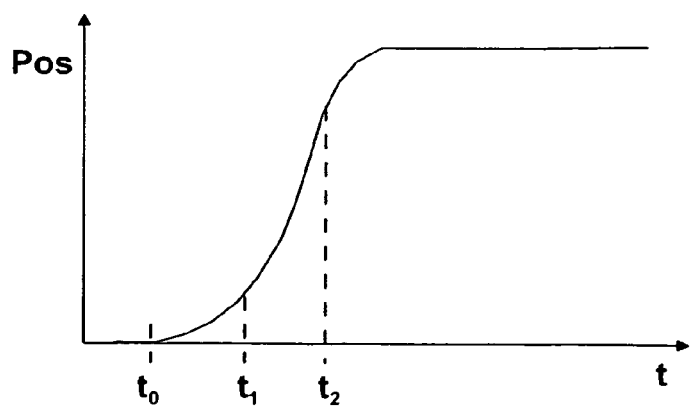
FIG. 25 shows, by way of example, the position of the fluid front as a function of time.

FIG. 24 shows the velocity of the fluid front and FIG. 25 shows the position of the fluid front as a function of time. The fluid front starts to move at $t_0$. The velocity of the first fluid 50 is substantially accelerated during the time interval $t_1$-$t_0$. At $t_1$ the fluid 50 impinges on the active area. At $t_2$ the first fluid 50 has completely covered the active area. The maximum velocity of the first fluid 50 may be reached already before $t_1$, or the average velocity may be maximized during the time interval $t_2$-$t_1$, in order to minimize the time interval $t_2$-$t_1$.

Figure 26:
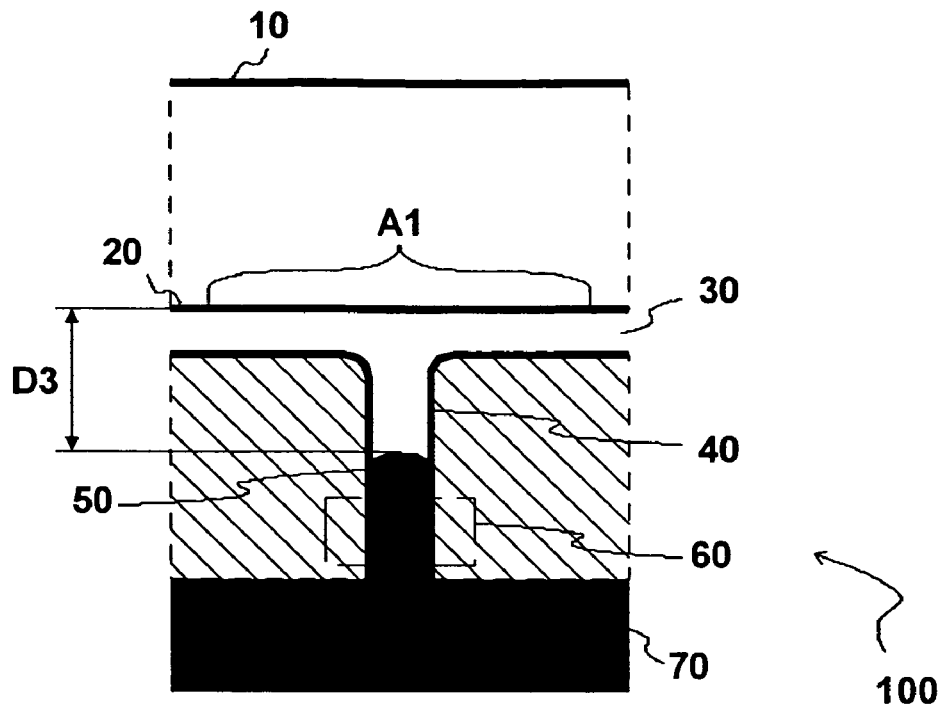
FIG. 26 shows the initial distance between the fluid front and the active area of the shutter.

Referring to FIG. 26 the distance D3 between the active area A1 and an initial position of the fluid front may be greater than or equal to 0.5 times the width D1 of the active area A1. The distance D3 allows the fluid front to accelerate substantially before the fluid front impinges on active area A1. An increase of the distance D3 shortens the time interval $t_2$-$t_1$ which is required to change the shutter from the reflecting state to the non-reflecting state. However, an increase of the distance D3 has also an adverse effect on the delay $t_1$-$t_0$. Thus, the distance D3 should be selected depending on the application.

Figure 27:
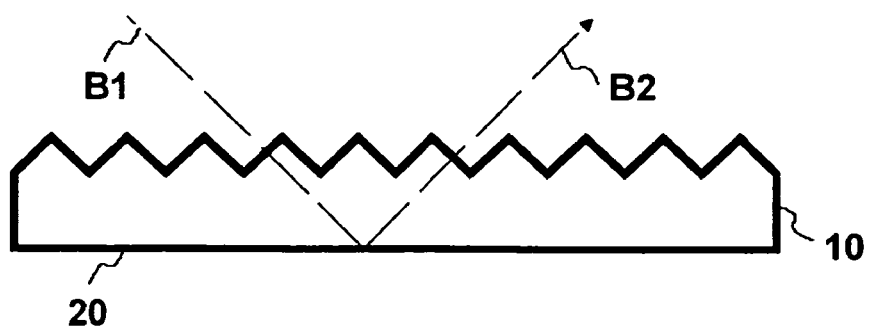
FIG. 27 shows schematically a transparent body having a plurality of prismatic protrusions.

Referring to FIG. 27, the transparent body 10 may comprise a plurality of prismatic protrusions to couple light rays into the transparent body 10 and/or out of the transparent body 10.

The transparent body 10 may comprise diffractive gratings to couple light rays into the body 10. The transparent body 10 may comprise inclined surfaces to couple light rays into the body 10. The transparent body 10 may be integrated into the imaging optics 300 (FIG. 1). The transparent body 10 may have at least one curved, spherical or aspherical surface acting as a lens. One or more lenses may be fastened to the body 10 by an adhesive.

Referring back to FIG. 1, the device 500 may be a digital camera. The device 500 may be a digital video camera. The device 500 may be a portable device comprising an imaging system. The device may be a mobile device comprising an imaging system. The device 500 may be, for example, a mobile phone comprising an imaging system. Yet, the device 500 may be a data processing device comprising an imaging system.

The image sensor 200 comprises an array of light-sensitive pixels. The image sensor 200 may be implemented e.g. using charged coupled device (CCD) technology, or complementary metal oxide semiconductor technology (CMOS). The image sensor 200 may also be implemented using phototransistors or silicon photodiodes.

The image of the target 900 may be obtained by a method comprising at least the steps of:

setting the shutter 100 to the reflecting state,
resetting or activating substantially all pixels of the image sensor 200,
exposing the pixels to light during a predetermined exposure time,
setting the shutter 100 to the non-reflecting state, and
reading the signals from the pixels to a memory or to a signal processing unit.

In this case the change from the non-reflecting state to the reflecting state may take place slowly, i.e. the timing of the opening of the shutter 100 is not critical.

Alternatively, the image of the target 900 may be obtained by a method comprising at least the steps of:

resetting or activating substantially all pixels of the image sensor 200,
setting the shutter 100 to the reflecting state,
exposing the pixels to light during a predetermined exposure time,
setting the shutter 100 to the non-reflecting state, and
reading the signals from the pixels to a memory or to a signal processing unit.

In this case both the opening and closing of the shutter 100 are critical.

In principle, the shutter 100 may also be used to control only the start of the exposure of the image sensor 200, and the end of the exposure period may be controlled in some other manner, if desired.

For any person skilled in the art, it will be clear that modifications and variations of the devices and the method according to the present invention are perceivable. The particular embodiments described above with reference to the accompanying drawings are illustrative only and not meant to limit the scope of the invention, which is defined by the appended claims.

What is claimed is:

1. A device comprising:
   an interface between a transparent body and a capillary space,
   at least one fluid reservoir,
   an amount of fluid,
   one or more fluid displacement elements to displace the amount of fluid between said fluid reservoir and said capillary space in order to change an operating state of the device from a first operating state to a second operating state, and in order to change the operating state of said device from said second operating state back to said first operating state, said first operating state allowing total internal reflection of oblique light rays impinging on an active area of said interface and said second operating state allowing transmission of said oblique light rays through said active area of said interface,
   one or more fluid ducts opposite said active area for delivering the amount of fluid to said capillary space,
   one or more further ducts for transferring a second fluid from said capillary space when the operating state is changed from the first operating state to the second operating state, and
   an absorber configured to absorb the light rays transmitted through said active area of said interface.

2. The device according to claim 1 wherein said displacement elements comprise electrodes configured to electrostatically displace said fluid.

3. The device according to claim 1 wherein said displacement elements are configured to change the internal pressure of at least one fluid reservoir.

4. The device according to claim 3 wherein said internal pressure is adapted to be changed by at least one actuator selected from the group consisting of a piezoelectric actuator, an electromagnetic actuator and an electrostatic actuator.

5. The device according to claim 1 wherein the distance between the amount of fluid and the active area is greater than 0.5 times the width of the active area when the shutter is in the first operating state.

6. The device according to claim 1 wherein said device comprises an electrode arrangement to electrostatically confine the amount of fluid within the boundaries of said active area.

7. An optical device comprising:
  imaging optics,
  an image sensor, and
  an optical shutter,
said optical shutter in turn comprising:
  an interface between a transparent body and a capillary space,
  at least one fluid reservoir,
  an amount of fluid,
  one or more fluid displacement elements to displace the amount of fluid between said fluid reservoir and said capillary space in order to change an operating state of said shutter from a first operating state to a second operating state, and in order to change the operating state of said shutter from said second operating state back to said first operating state, said first operating state allowing total internal reflection of oblique light rays impinging on an active area of said interface and said second operating state allowing transmission of said oblique light rays through said active area of said interface,
  one or more fluid ducts opposite said active area for delivering the amount of fluid to said capillary space,
  one or more further ducts for transferring a second fluid from said capillary space when the operating state is changed from the first operating state to the second operating state, and
  an absorber configured to absorb the light rays transmitted through said active area of said interface.

8. The optical device according to claim 7 wherein said optical device is a portable device.

9. The optical device according to claim 7 wherein said optical device comprises wireless data communication capabilities.

10. A method to control optical exposure of an image sensor by a shutter, said shutter comprising an interface between a transparent body and a capillary space, said method comprising:
  guiding light rays to an active area of said interface at an oblique angle,
  displacing an amount of fluid between at least one fluid reservoir and said capillary space through one or more fluid ducts in order to change an operating state of said shutter from a first operating state to a second operating state, and in order to change the operating state of said shutter from said second operating state back to said first operating state, said first operating state allowing total internal reflection of oblique light rays impinging on the active area of said interface and said second operating state allowing transmission of said oblique light rays through said active area of said interface, at least one of said fluid ducts being opposite said active area,
  transferring a second fluid from said capillary space through one or more further ducts when the operating state is changed from the first operating state to the second operating state,
  absorbing light rays transmitted through said active area, and
  in the first operating state guiding light rays reflected from said active area to said image sensor.

11. The method according to claim 10, said method further comprising:
  setting the shutter to the first operating state,
  resetting or activating pixels of the image sensor,
  exposing said pixels to the reflected light rays during a predetermined exposure time,
  setting the shutter to the second operating state, and
  reading signals from said pixels to a memory or to a signal processing unit.

12. An optical exposure controlling means comprising:
  an interface between a transparent means and a capillary space,
  a fluid storage means,
  an amount of fluid,
  a fluid displacement means for displacing the amount of fluid between said fluid storage means and said capillary space in order to change an operating state of said exposure controlling means from a first operating state to a second operating state, and in order to change the operating state of said exposure controlling means from said second operating state back to said first operating state, said first operating state allowing total internal reflection of oblique light rays impinging on an active area of said interface and said second operating state allowing transmission of said oblique light rays through said active area of said interface,
  one or more fluid guiding means opposite said active area for delivering the amount of fluid to said capillary space,
  one or more fluid transferring means for transferring a second fluid from said capillary space when the operating state is changed from the first operating state to the second operating state, and
  absorbing means for absorbing the light rays transmitted through said active area of said interface.

13. The exposure controlling means according to claim 12 wherein said displacement means comprise electrodes arranged to electrostatically displace said amount of fluid.

* * * * *